United States Patent [19]

Taylor

[11] Patent Number: 4,718,648

[45] Date of Patent: * Jan. 12, 1988

[54] TENSION-COMPRESSION LIQUID SPRING UNIT

[75] Inventor: Douglas Taylor, Tonawanda, N.Y.

[73] Assignee: Tayco Developments, Inc., North Tonawanda, N.Y.

[ * ] Notice: The portion of the term of this patent subsequent to Sep. 16, 2003 has been disclaimed.

[21] Appl. No.: 905,799

[22] Filed: Sep. 10, 1986

[51] Int. Cl.$^4$ .............................................. F16F 5/00
[52] U.S. Cl. ................................ 267/64.13; 267/140
[58] Field of Search .................. 188/321.11, 322.17, 188/322.19, 322.22; 267/64.11, 64.13, 124, 126, 136, 138, 140; 92/52, 53, 65; 213/43, 44, 45

[56] References Cited

U.S. PATENT DOCUMENTS

| | | | |
|---|---|---|---|
| 2,842,356 | 7/1958 | Taylor | 267/124 |
| 3,098,644 | 7/1963 | Phillips | 267/64.11 |
| 4,127,269 | 11/1978 | Rest | 267/140 X |
| 4,611,794 | 9/1986 | Taylor | 267/136 |
| 4,647,025 | 3/1987 | Gold | 267/140 X |

Primary Examiner—Joseph Falk
Attorney, Agent, or Firm—Joseph P. Gastel

[57] ABSTRACT

A liquid spring unit operable in both tension and compression includes a liquid spring having a cylinder, a piston, a seal between the cylinder and piston, and compressible liquid in the cylinder. A cylinder extension has diametrically opposed slots therein. A sleeve slidably mounts the cylinder and has diametrically opposed slots in alignment with the slots in the cylinder extension. A link is attached to the piston and has pintles received in the pairs of aligned slots. A first load-receiving member is attached to the sleeve and a second load-receiving member bears on the link to force the piston into the cylinder when the load-receiving members are moved toward each other and causes the cylinder to be moved onto the piston when the load-receiving members are pulled away from each other. A mechanical spring structure having a lower spring force than the liquid spring is interposed between the first and second load-receiving members for attenuating low amplitude forces.

22 Claims, 24 Drawing Figures

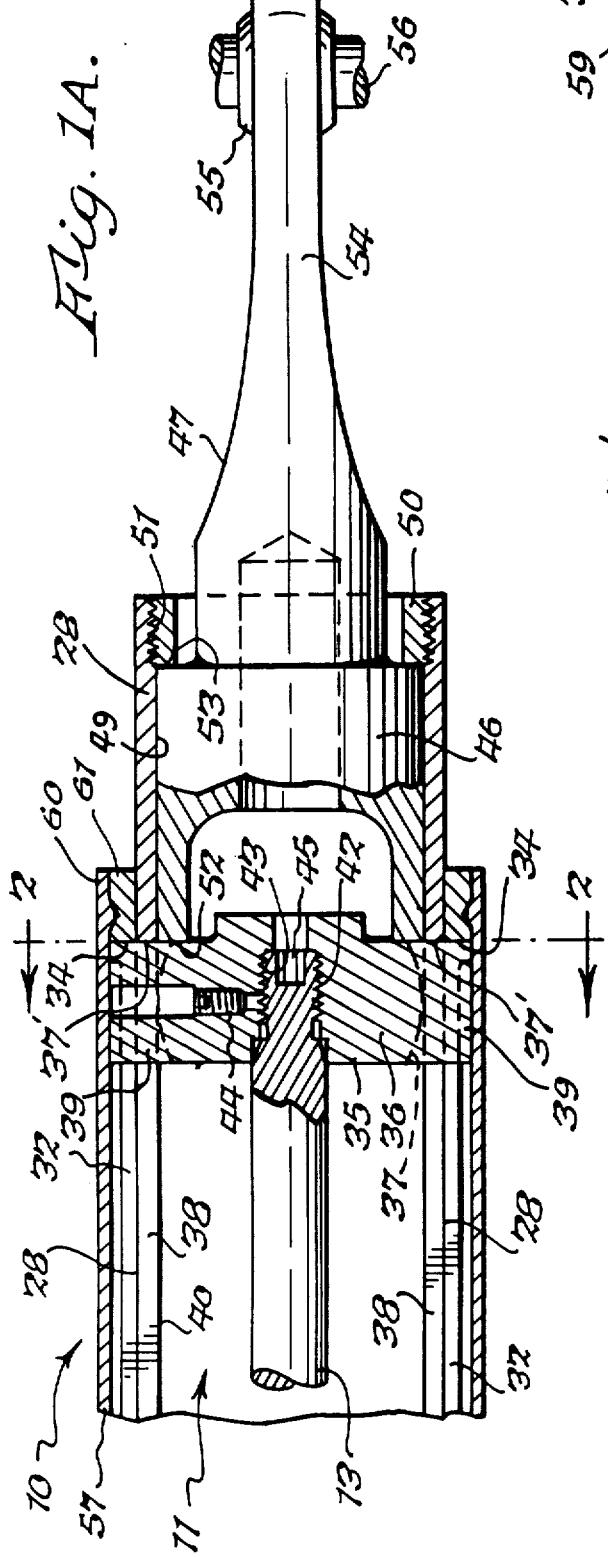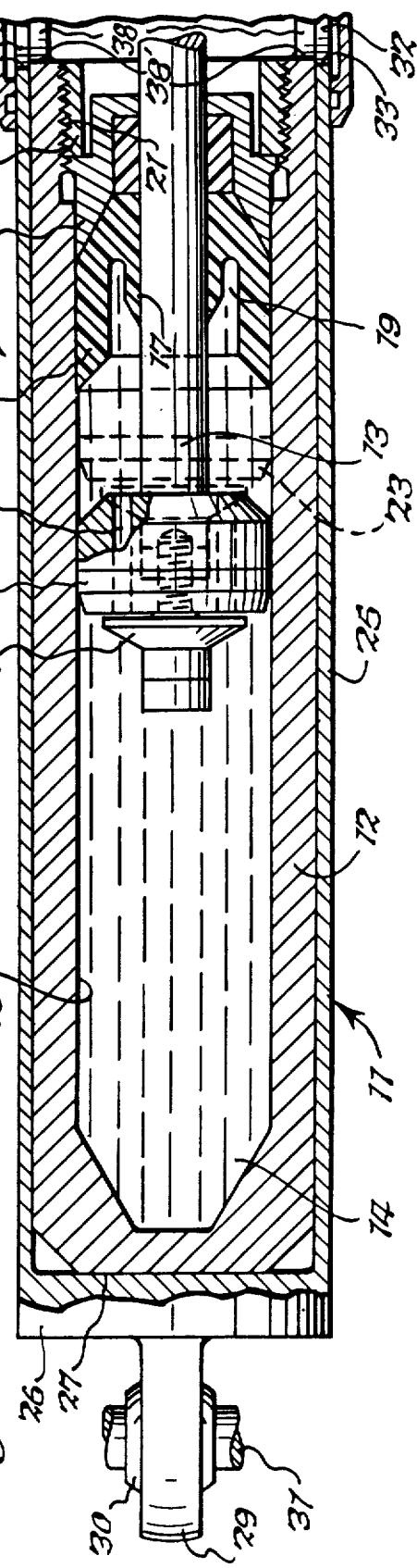

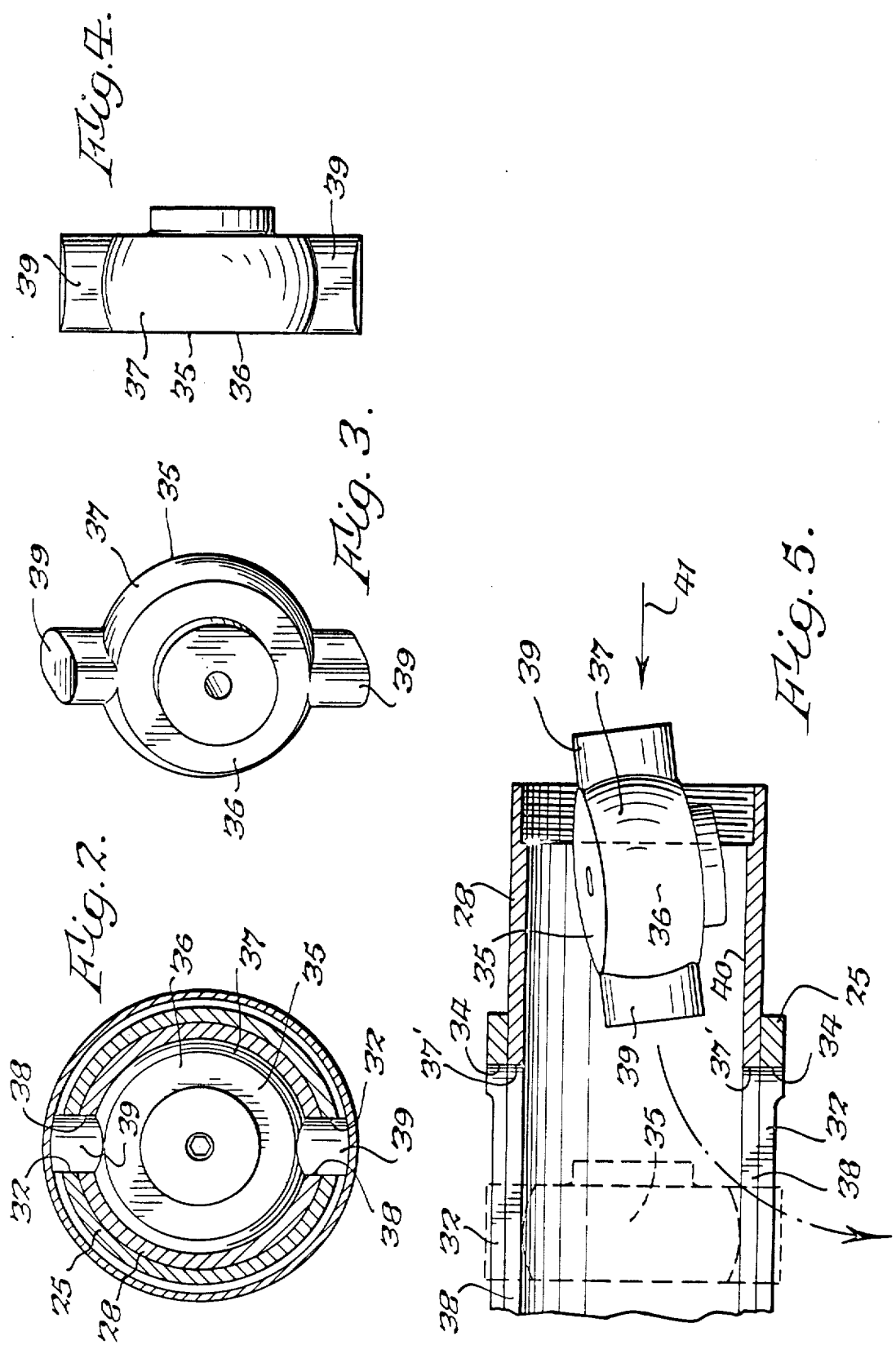

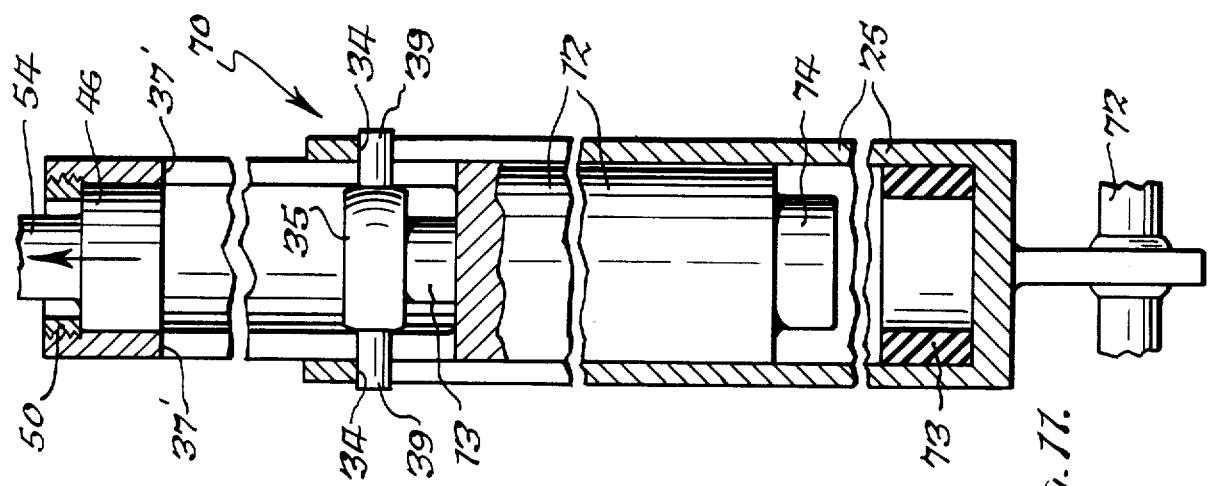
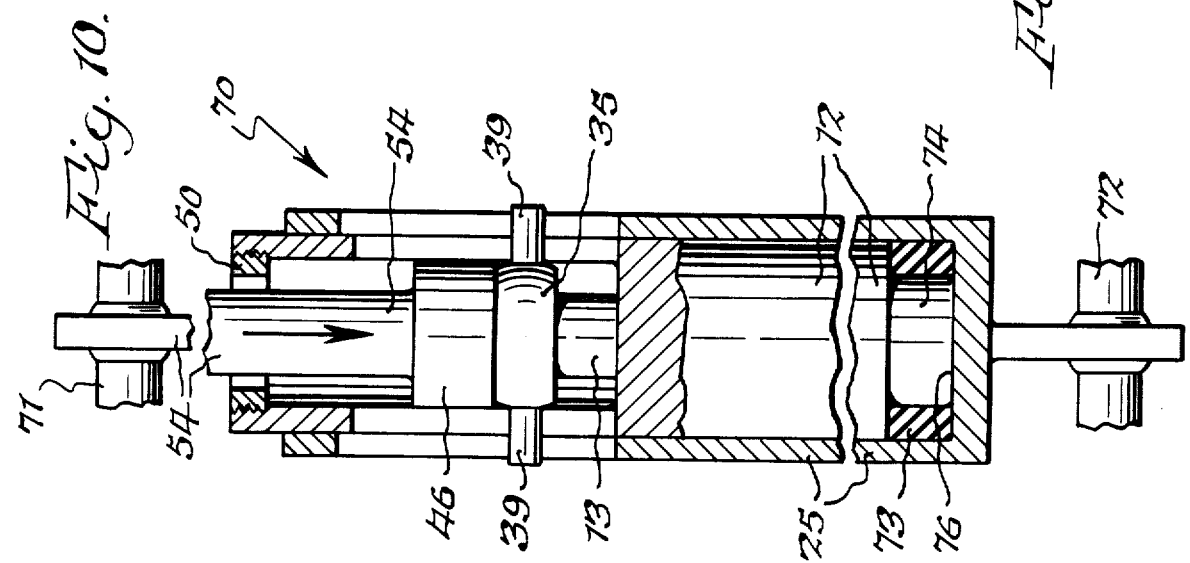
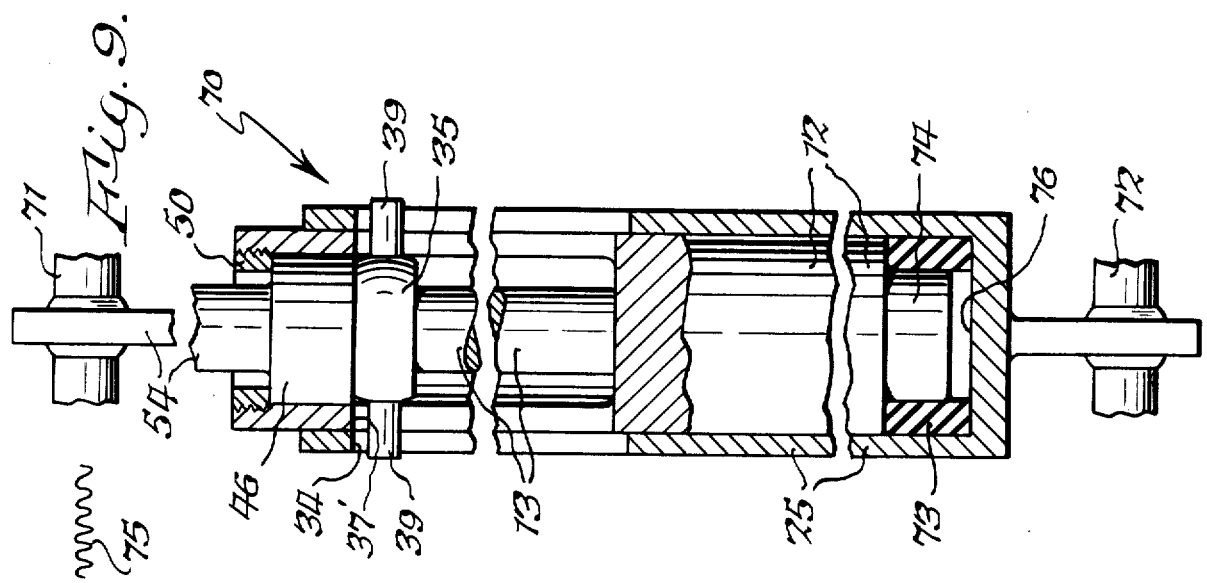

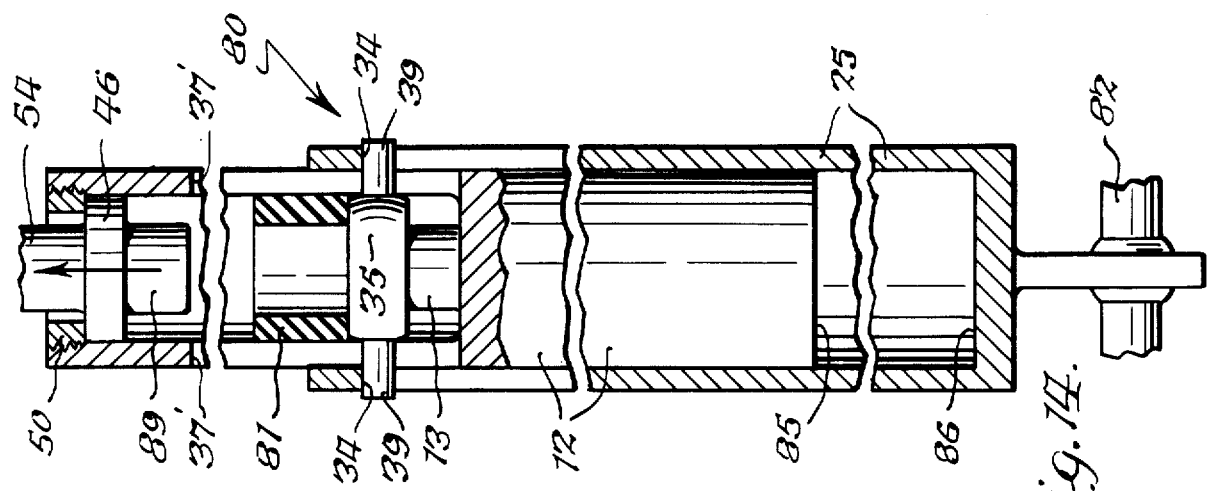
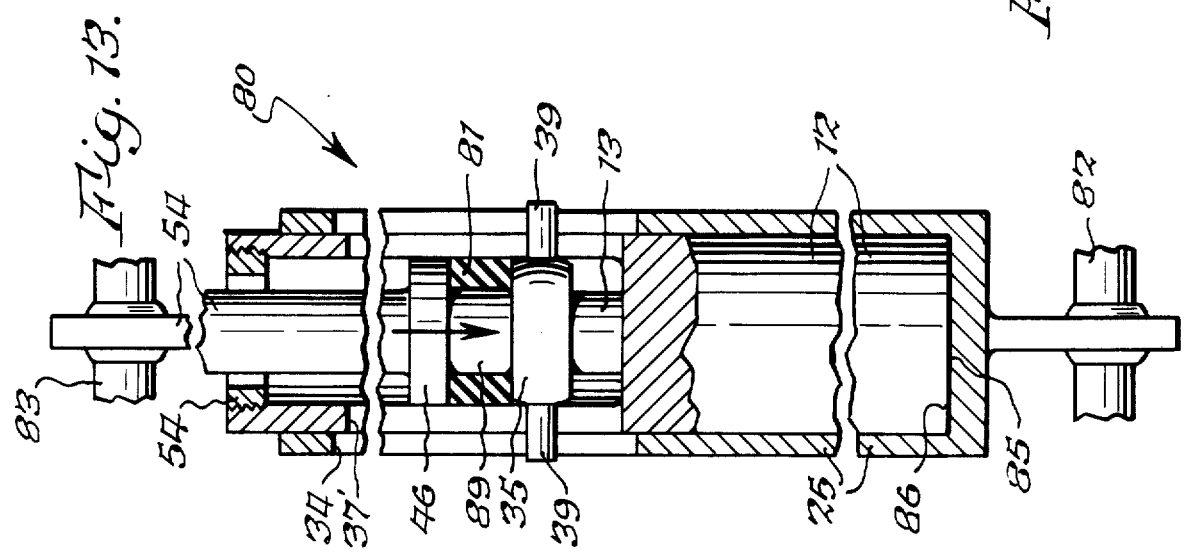
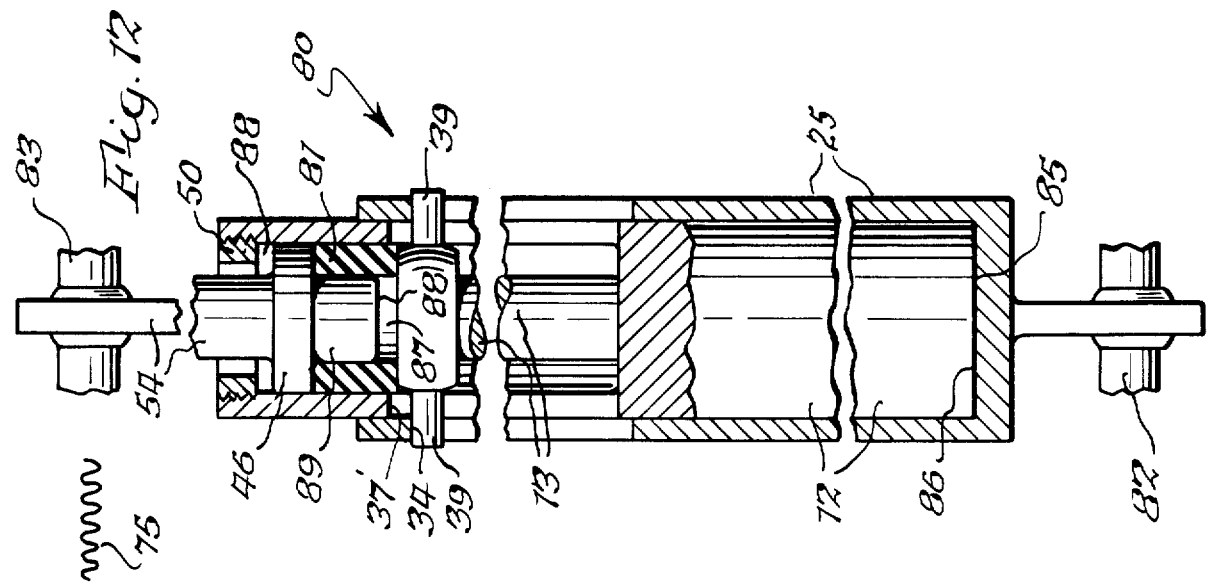

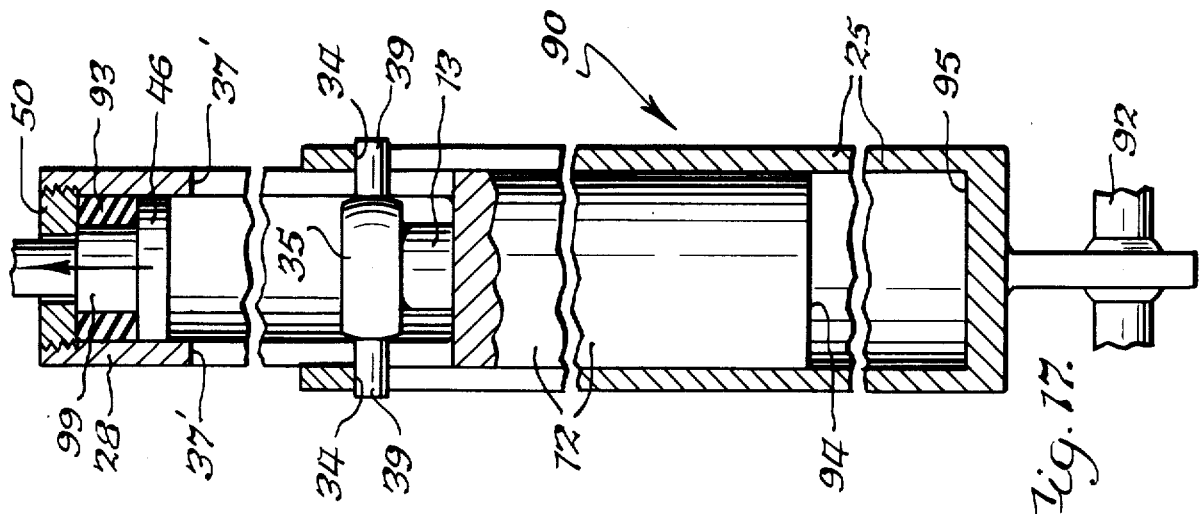
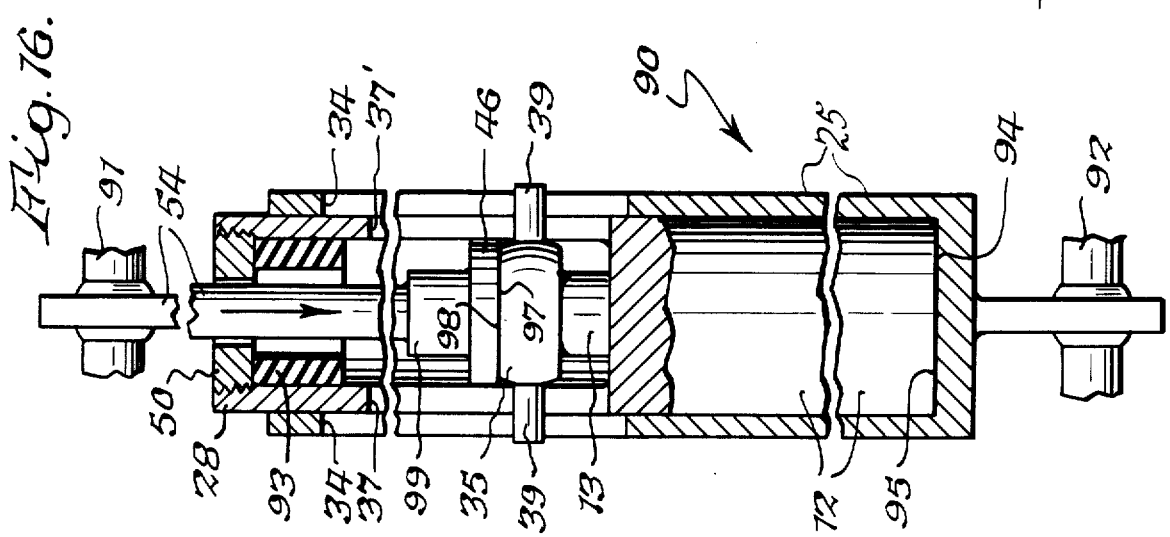
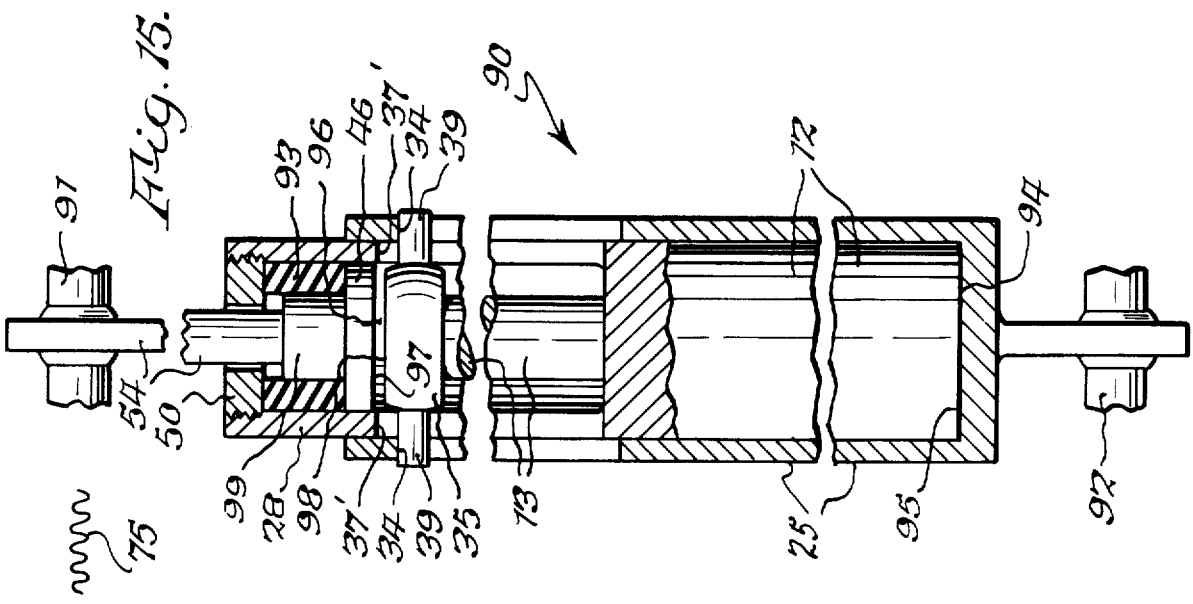

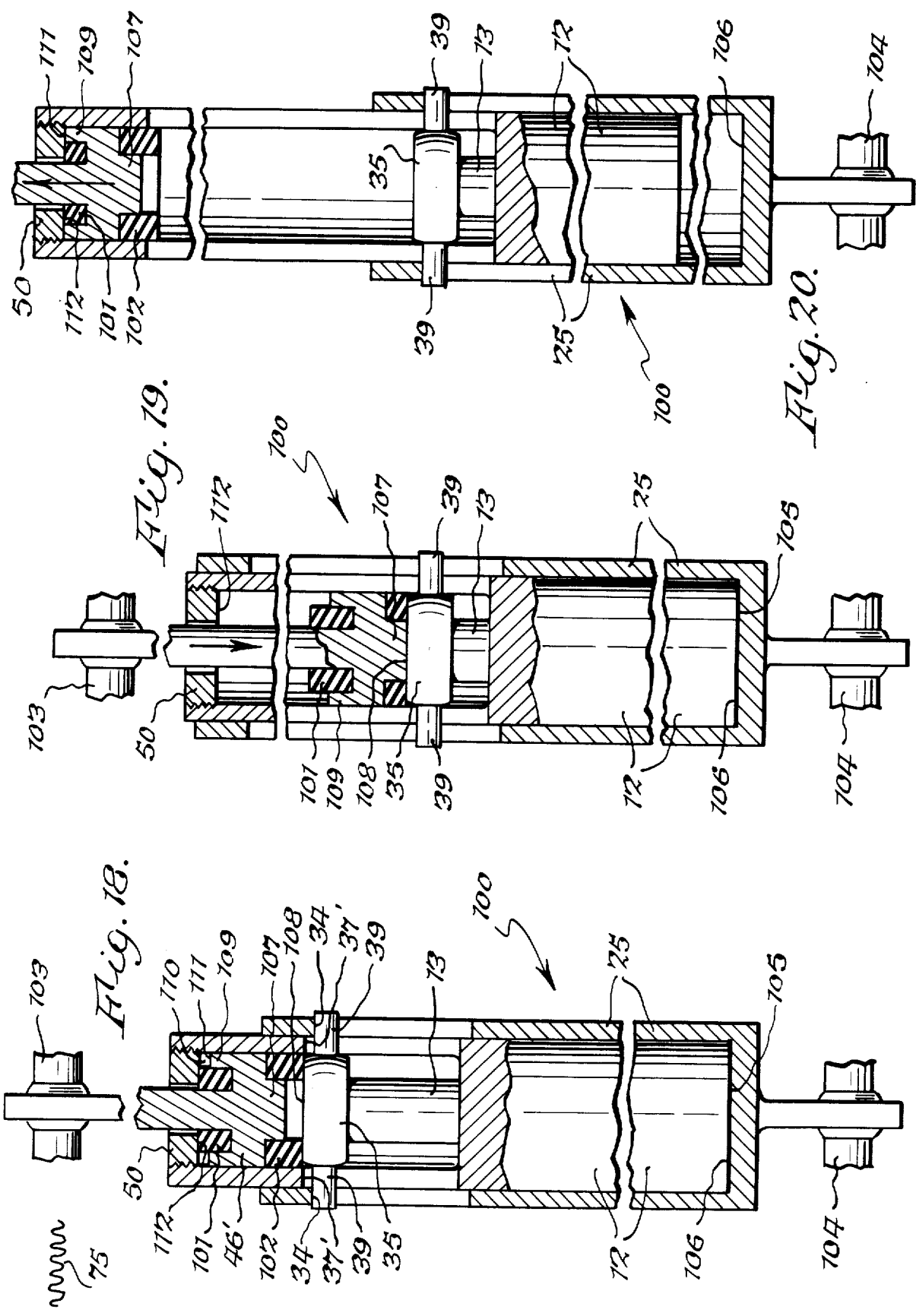

TENSION-COMPRESSION LIQUID SPRING UNIT

BACKGROUND OF THE INVENTION

The present invention relates to an improved liquid spring unit operable in both tension and compression and which can attentuate low amplitude vibrations.

U.S. Pat. No. 4,611,794, issued Sept. 16, 1986, discloses a liquid spring unit operable in tension and compression. However, when the spring unit is not being stressed, it functions as a rigid link so that low amplitude vibrations, which may be of high frequency, are transmitted therethrough. It is with overcoming the foregoing deficiency that the present invention is concerned.

SUMMARY OF THE INVENTION

It is accordingly the primary object of the present invention to provide an improved liquid spring unit operable in both tension and compression and which will attentuate low amplitude vibrations, so that such vibrations are not transmitted through the liquid spring unit.

Another object of the present invention is to provide an improved liquid spring unit operable in both tension and compression which includes mechanical spring means having a lower spring force than the liquid spring contained therein for absorbing low amplitude forces and which are automatically rendered inactive when the forces applied to the liquid spring unit exceed a predetermined value so that they are absorbed by the liquid spring in the unit.

A further object of the present invention is to provide a multiplicity of variations of a liquid spring unit operable in tension and compression which will attentuate low amplitude vibrations and which can be initially loaded in either tension or compression or both. Other objects and attendant advantages of the present invention will readily be perceived hereafter.

The present invention relates to a liquid spring unit operable in both tension and compression comprising: a liquid spring including a cylinder, piston, compressible liquid in said cylinder, and liquid seal means between said piston and cylinder; a housing mounting said cylinder therein for slidable movement; first attachment means on said housing for attachment to a first structural member; second attachment means spaced from said first attachment means and mounted relative to said cylinder for attachment to a second structural member; first means supported by said housing for holding said cylinder against movement in a first direction when said first and second spaced attachment means are moved toward each other to cause said second attachment means to effectively engage said piston and cause said piston to move in said first direction into said cylinder to thereby provide a spring action in compression; second means supported by said housing for holding said piston against movement in a second direction which is opposite to said first direction when said first and second spaced attachment means are moved away from each other to cause said cylinder to be moved in said second direction to thereby provide a spring action in tension; and mechanical spring means having a lower spring force than said liquid spring operatively interposed between said first and second attachment means for absorbing low amplitude forces without driving said piston into said cylinder when said first and second attachment means move relative to each other in response to said low amplitude forces being applied thereto.

The various aspects of the present invention will be more fully understood when the following portions of the specification are read in conjunction with the accompanying drawings wherein:

BRIEF DESCRIPTION OF THE DRAWINGS

FIG. 1A is a fragmentary cross sectional view of one end of a prior basic tension-compression liquid spring unit which is to be modified in accordance with the present invention;

FIG. 1B is a fragmentary cross sectional view of the opposite end of the prior tension-compression liquid spring unit;

FIG. 2 is a cross sectional view taken substantially along line 2—2 of FIG. 1A and showing the relationship between the various parts;

FIG. 3 is a perspective view of the spherical load member or link;

FIG. 4 is a side elevational view of the link of FIG. 3;

FIG. 5 is a fragmentary cross sectional view showing the manner in which the spherical load member or link is installed in position in the remainder of the unit;

FIG. 9 is a schematic view of the prior unit of FIGS. 1–8 which has been modified in accordance with the present invention and which is under slight compression and is attenuating low amplitude, high frequency vibrations;

FIG. 10 is a view showing the tension-compression unit of FIG. 9 subjected to a high amplitude compressive shock load;

FIG. 11 is a view of the device of FIG. 9 subjected to a high amplitude load which places the unit in tension;

FIG. 12 is a view of a modified form of the tension-compression liquid spring shown in its normal position supporting a load in compression and attenuating high frequency, low amplitude vibrations;

FIG. 13 is a view of the device of FIG. 12 when subjected to a high amplitude compressive shock load;

FIG. 14 is a view of the device of FIG. 12 when subjected to a high amplitude shock load in tension;

FIG. 15 is a view of another modification of the device for supporting a load in tension and attenuating high frequency, low amplitude vibrations;

FIG. 16 is a view of the device of FIG. 15 when subjected to a high amplitude compressive shock load;

FIG. 17 is a view of the device of FIG. 15 when subjected to a high amplitude shock load in tension;

FIG. 18 is a view of another modified device supporting a load in tension and attenuating high frequency, low amplitude vibrations;

FIG. 19 is a view of the device of FIG. 18 when subjected to a high amplitude compressive shock load;

FIG. 20 is a view of the device of FIG. 18 when subjected to a high amplitude shock load in tension;

DESCRIPTION OF THE PREFERRED EMBODIMENTS

Figure 6:
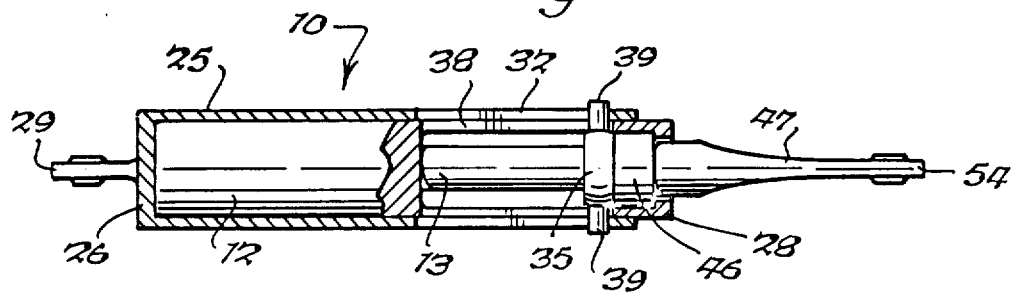
FIG. 6 is a schematic fragmentary cross sectional view of the prior unit in a neutral position when it is not subjected to either tension or compression.

The prior liquid spring unit 10 of FIGS. 1-8 over which the present invention is an improvement is fully disclosed and claimed in U.S. patent application Ser. No. 250,845, filed Apr. 3, 1981, now U.S. Pat. No. 4,611,794, issued Sept. 16, 1986.

The prior liquid spring unit 10 is operable in both tension and compression and utilizes a single liquid spring 11 consisting essentially of a cylinder 12 having a piston 13 and containing a compressible liquid 14, such as a silicone liquid, in chamber 15. The unit 10 is operable to provide a hydraulic spring action in both tension and compression by virtue of the manner in which the liquid spring 11 is mechanically mounted on the remainder of the unit, thereby permitting the use of a single seal 16 which seals the compressible liquid 14 from leakage between seal 16 and cylinder 12 and between seal 16 and piston 13. In this respect, seal 16 includes an annular lip 17 which receives piston 13, and an annular chamber 19 surrounds lip 17 so that the pressurized liquid in chamber 19 will enhance the sealing relationship. The foregoing sealing arrangement is well known in the art.

An annular metallic cap 20 screws into tapped portion 21 of the cylinder to move seal 16 to its desired position and while doing so effects compression of the compressible liquid 14 to approximately 3% or roughly about 6,000 psi internal pressure, or any practical desired amount in excess thereof. A threaded collar 22 is also received in tapped portion 21 to hold cap 20 in position. Piston 13 mounts a shock absorber head 23 which modulates flow of liquid on opposite sides thereof to accomplish dampening, the flow being between the outer periphery of head 23 and the inner surface of cylinder 12. A fast return valve 24 is mounted for slidable axial movement relative to shock absorber head 23 to close off ports 24 when piston 13 moves to the left and which returns to the open position shown in FIG. 1B to permit a fast return of piston 13 to the piston in which it will move as the liquid 14 expands. This type of action is especially desirable when the unit 10 is used in conjunction with an arresting hook construction for navy carrier aircraft. The foregoing described construction of the hydraulic spring 11 is known and by itself does not constitute the novel portion of the present device.

As noted briefly above, the hydraulic spring 11 is utilized in conjunction with a mechanical construction, thereby permitting the use of the single seal 16. The unit 10 includes a housing or sleeve 25 in which cylinder 12 is slidably mounted. An end wall 26 on sleeve 25 is abutted by the end wall 27 of cylinder 12 under certain conditions, as will be described hereafter. An attachment member 29 is rigidly attached to end wall 26 and pivotally mounts a spherical ball 30 which is attached to an external member 31. Housing 25 also includes a pair of diametrically opposed slots 32 (FIGS. 1A, 1B, 2 and 5). Slots 32 terminate at 33 in FIG. 1B and at 34 in FIG. 1A. A cylinder extension 28 is formed integrally with cylinder 12. Diametrically opposed slots 38 are formed in cylinder extension 28. Slots 38 terminate at 37' in FIG. 1A and at 38' in FIG. 1B.

A spherical loading member or link 35 includes a central portion 36 having a spherical outer surface 37 from which a pair of diametrically opposed pintles 39 extend. Pintless 39 ride in slots 32 and 38. The outer diameter of spherical surface 37 is slightly less than the internal diameter at 40 of cylinder extension 28. Link 35 is installed into the position shown in FIG. 1A by inserting it in the direction of arrow 41 (FIG. 5) into cylinder extension 28, as shown, and thereafter rotating link 35 to cause pintles 39 to be received in slots 38 and 32. Link 35 is shown in its rotated position in dotted lines in FIG. 5. During the installation, piston 13 is moved to the left in FIG. 1B as much as it is necessary, possibly to the solid line position, to permit link 35 to be installed. Thereafter, piston 13 is released so that the threaded end portion 42 of piston 13 is aligned with tapped portion 43 of link 35. Thereafter, piston 13 is rotated so that a threaded connection is established between threaded end portion 42 and tapped portion 43. A set screw 44 is thereafter installed in link 35, as shown in FIG. 1A, to hold the link 35 and piston 13 in locked relationship. Piston 13 is rotated to effect the foregoing union by inserting an Allen wrench into socket 45. In the neutral position of unit 10, pintles 39 abut ends 34 and 37' of slots 32 and 38, respectively.

After the piston 13 and link 35 have been assembled, the end portion 46 of attachment member 47 is then slid into chamber 49 of cylinder extension 28. A threaded securing collar 50 is threaded into tapped portion 51 at the end of extension 28 to hold portion 46 in position with one end 52 abutting the face of link 35 and the opposite end 53 abutting annular ring 50. Attachment member 47 includes a shank portion 54 pivotally mounting a spherical ball member 55 which attaches to an external member 56.

A protective sleeve 57 has one end 59 located on sleeve 25 in the position shown in FIG. 1B and the other end 60 mounted on ring 61 which is slidably mounted on cylinder extension 28. Sleeve 57 protects the inside of unit 10 against the entry of foreign matter through slots 38 and 32.

Figure 7:
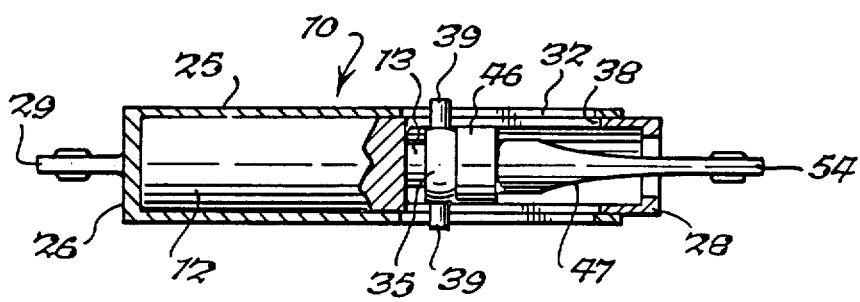
FIG. 7 is a view similar to FIG. 6 but showing the position the parts assume when the prior unit is placed in compression.
Figure 8:
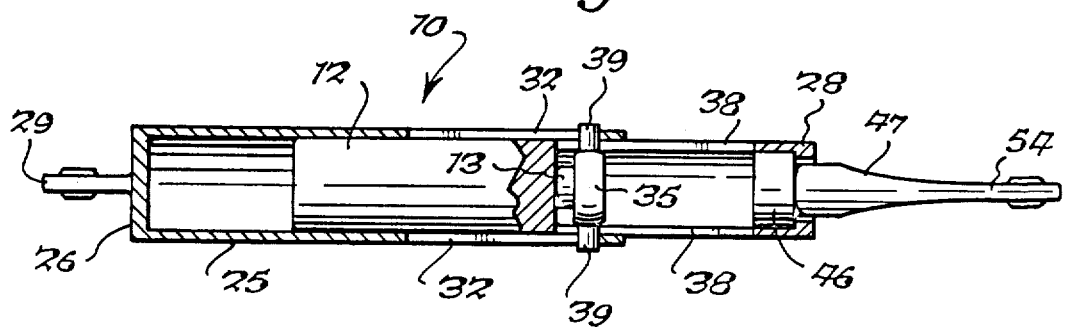
FIG. 8 is a view similar to FIG. 6 but showing the positions which the parts assume when the prior unit is placed in tension.

The operation of unit 10 can best be explained by reference to FIGS. 6-8. In FIG. 6 unit 10 is shown in a neutral position, that is, it is neither placed in tension or compression, and accordingly the various parts are in the same position as shown in FIGS. 1A and 1B. When structural members 31 and 56 (FIGS. 1A and 1B) are caused to approach each other, unit 10 is placed in compression, and the parts move to the position of FIG. 7 from the neutral position of FIG. 6. In this event, end portion 46 of attachment member 47 bears against link or load-receiving member 35 which in turn bears against the end of piston 13 driving it into cylinder 12, and the latter is held against movement because it abuts end wall 26 of sleeve 25. During the compressive action, pintles 39 ride freely in slots 38 and 32. When structural members 56 and 31 are pulled apart, unit 10 is placed in tension. In this case, end portion 46 of attachment member 47 pulls on cylinder extension 28 and this causes cylinder 11 to move to the position of FIG. 8 from the position of FIG. 6. However, pintles 39 of load-bearing member or link 35 will ride in slots 38 but will abut ends 34 of slots 32, and thus link 35 will be held against movement while piston 13 bears against it and is driven into cylinder 12. Thus, essentially when unit 10 is placed in compression, the piston 13 is driven into cylinder 11, whereas when the unit is placed in tension, the cylinder 11 is caused to be driven onto piston 13. When the external forces applied to structural members 31 and 56 are removed, the inherent spring quality of liquid spring 11 will cause the unit to return to the neutral position of FIG. 6.

The liquid spring unit 10 of FIGS. 1-8 will function as a rigid link when subjected to low amplitude forces, in either tension or compression, which are insufficient to separate pintles 39 from slot ends 34 or from both slot ends 34 and 37', and thus such low amplitude forces will be transmsitted through unit 10. Thus, when unit 10 functions as a rigid link, it will also transmit low amplitude, high frequency vibrations.

In FIGS. 9-11 a modification 70 of prior tension-compression liquid spring unit 10 is disclosed which will attenuate low amplitude vibrations, which may be of high frequency, and thus will not transmit such vibrations between the members 71 and 72 between which it is located. The basic difference between the embodiment of FIGS. 1-8 and the embodiment of FIGS. 9-11 is that a spring 73 has been positioned between the end of housing 25 and cylinder 12 has a boss 74 at its lower end which is encircled by spring 73. At this juncture it is to be noted that certain of the numerals used hereafter in conjunction with all of the figures above FIG. 8 will be the same as the numerals used in conjunction with FIGS. 1-8 to denote identical elements of structure and therefore will not be described again. The spring 73 may be an annular elastomeric member or it may be a helical metal spring or it may be a plurality of helical springs with their axes parallel to the axes of cylinder 12 or it may be a Bellville washer type of spring, or any other type of spring or spring arrangement. The only criterion is that it should be a spring of a sort.

When tension-compression unit 70 is in its normal condition before having been placed between members 71 and 72, pintles 39 may preferably be in abutting relationship with slot ends 34 and 37', or the unit may be dimensioned so that there are spaces between pintles 39 and the slot ends 34 and 37'. End portion 46 is in abutting relationship with link 35, and abuts securing collar 50. Damping head 23 is positioned against seal 16 in its dotted line position so that the liquid spring 11 does not exert a biasing force within the unit 70 when it is not under a load. The only force within unit 70 is exerted by spring 73 which has a lower spring force than the liquid spring and which is under slight compression due to the dimensioning of the unit. When unit 70 is placed between members 71 and 72 in FIG. 9, it will be assumed that there is sufficient compressive loading between these members to cause pintles 39 to be spaced from slot ends 34 and 37' so that spring 73 is compressed to some extent but has not reached its limit of compression, that is, it can be compressed further. Accordingly, when a high frequency, low amplitude vibration 75 is applied to either structural member 71 or 72, this vibration will be absorbed by the compression and expansion of spring 73. During this slight movement boss 74, secured to the underside of cylinder 12, will not contact bottom 76 of housing 25. Thus spring 73 will absorb low amplitude shocks without causing the liquid spring 12 to function other than as a rigid link. During the absorption of low amplitude shocks, oscillating pintles 39 will not engage slot ends 34 and 37'.

When unit 70 is subjected to a high amplitude shock force in compression, the parts of unit 70 will assume the position shown in FIG. 10 wherein boss 74 bottoms out at the end 76 of housing 25 and spring 73 is compressed and piston 13 is driven into cylinder 12. When unit 70 is subjected to a high amplitude shock force in tension from its previous position shown in FIG. 9, the parts will assume the position shown in FIG. 11 wherein boss 74 is pulled upwardly away from its position near the bottom 76 of housing 25 and wherein member 46 pulls the cylinder 12 to the position shown and wherein pintles 39 are forced up against slot ends 34 while slot ends 37' are moved to the position shown in FIG. 11.

In FIGS. 12-14 another tension-compression liquid spring embodiment 80 is shown which is intended to be placed between members which normally exert a compressive force thereon. The difference between this embodiment and the embodiment of FIGS. 9-11 is that a mechanical spring 81 is interposed between end portion 46 and link 35. Spring 81 may take any form, as expressed above relative to spring 73 of FIGS. 9-11. In this embodiment spring 81 may initially be placed in slight compression while end portion 46 engages collar 50. In FIG. 12 unit 80 is installed between two members 82 and 83 which tend to exert a compressive force on the unit when the unit is in its installed position. In this situation, members 82 and 83 will move toward each other and spring 81 will be further slightly compressed. Before such compression, the dimensioning of the parts was such that pintles 39 engaged the slot ends 34 and were spaced from slot ends 37' and spring 81 was under compression and damping head 23 (FIG. 1B) was up against seal 16 in its dotted line position. When members 82 and 83 move toward each other under an initial compressive load, spring 81 will be compressed further but piston 13 will not be driven into cylinder 12. This occurs because spring 81 has a force due to its deflection which is less than the preload force of the liquid spring. When members 82 and 83 move toward each other during low amplitude vibration, spring 81 will compress and expand, and piston 13 will not be driven into into cylinder 12. There is a sufficiently large space 87 between link 35 and the end 88 of boss 89 on member 46 so that there is no contact therebetween when low amplitude forces move them toward each other. When members 82 and 83 move apart during low amplitude vibration, member 46 will move upwardly without contacting securing collar 50 because of the space 88 therebetween. It will be appreciated, however, that before the unit 80 was installed in a compressive situation, member 46 could have been in abutting relationship with collar 50, and spring 81 could have been under compression, and the bottom 85 of cylinder 12 was in engagement with the end 86 of housing 25.

In FIG. 13 the unit 80 is shown with its parts in the position which they assume when a high compressive shock force is applied to it. In this condition, spring 81 is compressed to a greater extent, and the end 88 of boss 89 abuts link 35 and piston 13 is driven into cylinder 12. The length of boss 89 determines the amount spring 81 is compressed. In FIG. 14 unit 80 is shown with its parts in the positions which they assume when the unit 80 is subjected to a high tensile shock force. In this situation, piston 13 is driven into cylinder 12 and spring 81 has expanded.

In FIGS. 15-17 a further embodiment is shown which is to be located between members which normally will exert a small tensile force on the tension-compression unit. Unit 90 is mounted between members 91 and 92. In this embodiment a mechanical spring 93 (which may assume any form) is located between end portion 46 and collar 50 at the end of cylinder extension 28. The unit 90 is initially dimensioned before installation so that pintles 39 engage the slot ends 34, and the slot ends 37' are spaced from pintles 39, and the bottom 94 of cylinder 12 engages the bottom wall 95 of housing 25 and member 46 may be in engagement with link 35 and spring 93 may be in slight compression, and damping head 23 is in its dotted line position of FIG. 1B. When unit 85 is installed in its operative environment, it is placed in tension by being pulled apart when it is mounted on members 91 and 92, and thus a small tensile load is normally exerted on unit 90. Spring 93 will thus be compressed slightly further, and member 46 will be pulled away from link 35 to create a space 96 therebetween. When the unit is then subjected to low amplitude vibrations, which may be of high frequency, as a result of members 91 and 92 moving toward and away from each other, the following action will occur. As members 91 and 92 move toward each other, spring 93 will expand, but the surface 97 of member 46 will not abut surface 98 of link 35. However, when the parts 91 and 92 move away from each other, member 46 will compress spring 93 further to absorb the forces. Thus, in the embodiment of FIG. 15, low amplitude vibrations will be attenuated by spring 93.

In FIG. 16 unit 90 is shown after having been subjected to a high compressive shock force and the parts will assume the positions shown therein wherein piston 13 is driven into cylinder 12. In FIG. 17 the unit 85 is shown after having been subjected to a high tensile shock force and the parts are shown in the position which the unit 85 is shown after having been subjected to a high tensile shock force and the parts are shown in the position which the unit assumes under this condition. In this respect a boss 99 is associated with member 46 and it is of an axial length to limit the amount which spring 93 is compressed because the top of boss 99 will engage collar 50 before spring 93 is fully compressed.

Figure 21:
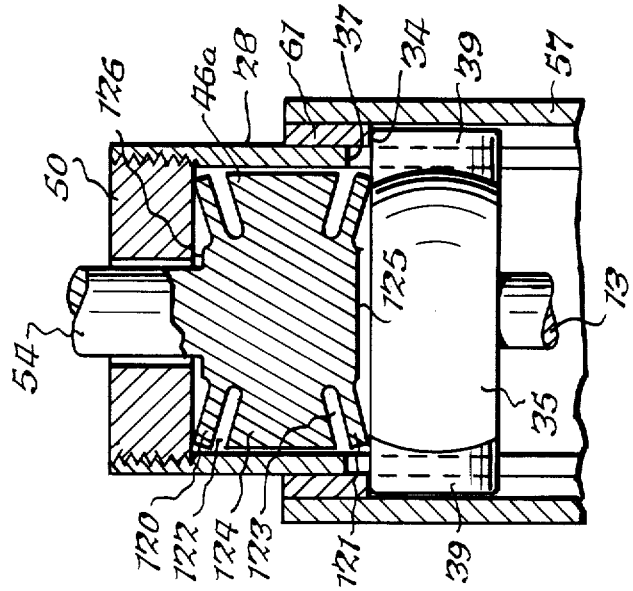
FIG. 21 is a view of a modification of the spring structure of FIGS. 18–20.

In FIGS. 18–20 a further modified tension-compression unit 100 is shown which attenuates low amplitude forces in both tension and compression. In this embodiment a first mechanical spring 101 is placed between member 46' and collar 50 and a second mechanical spring 102 is placed between member 46' and link 35. Springs 101 and 102 may be of any form as expressed above relative to spring 73. The unit 100 of FIG. 21 is initially dimensioned, before installation between members 103 and 104 so that pintles 39 abut the slot ends 34 and the bottom 105 of cylinder 12 engages the end 106 of housing 25 and springs 101 and 102 are under slight compression, and pintles 39 engage slot ends 37'. Member 46', which is analogous to members 46 of the previous figures, includes a boss 107 which is spaced from surface 108 of link 35. An annular rim 109 extends upwardly from member 46', and an annular space 110 exists between annular surface 111 and the inner surface 112 of collar 50. As in the other embodiments, damping head 23 is in its dotted line position against seal 16. Springs 101 and 102 are preferably under slight compression. In FIG. 18 the unit 100 is shown when initially loaded with a tensile force between members 103 and 104 which are being pulled apart. Under this condition, spring 101 will initially be compressed more than it was originally and spring 102 will be expanded slightly from its original state of slight compression. When the unit 100 is subjected to a low amplitude vibration, spring 101 will expand as members 103 and 104 approach each other and spring 102 will be compressed. As members 103 and 104 move away from each other, spring 101 will tend to be compressed more and spring 102 will expand. Thus there is an attenuation of the high low amplitude vibrations, which may be of high frequency. However, since springs 101 and 102 have a lower spring force than liquid spring 12, the latter will function as a rigid link, that is, piston 13 will not be driven into its cylinder 12. Furthermore, since the space between boss 107 and surface 108 of link 35 and the space between surface 111 of annular member 109 and surface 112 of collar 50 are greater than the amplitude of the vibration, there will be no metal-to-metal contact which can be transmitted through unit 100.

Unit 100 also can be initially loaded in compression, and springs 101 and 102 will function in the same manner described above when it was initially loaded in tension. The only difference is that spring 102 will be compressed slightly more than it was initially and spring 101 will be compressed slightly less than it was initially.

In the embodiment of FIGS. 18–20, while springs 101 and 102 have been disclosed as shown, it will be appreciated that spring 102 may be relocated to a position between end 105 of cylinder 12 and surface 106 of housing 25, and the boss 107 may be placed on the end 105 of cylinder 12, as shown in FIGS. 9–11.

In FIG. 19 the parts are shown when unit 100 is subjected to a high amplitude shock force in compression, that is, when members 103 and 104 are forced toward each other. When this occurs, the end of boss 107 will engage surface 108 of link 35 and drive piston 13 into cylinder 12, but boss 107 will limit the amount spring 102 is compressed. In FIG. 20, the parts are shown when unit 100 is subjected to a high amplitude shock force in tension, that is, when members 103 and 104 are forced apart. When this occurs, annular surface 111 of annular rim 109 will engage surface 112 of collar 50 to pull cylinder 12 to the position shown. However, annular rim 109 will limit the amount spring 101 is compressed. From the foregoing description of FIGS. 18–20 it can be seen that unit 100 can be initially loaded in either tension or compression and it will attenuate low amplitude vibrations.

In FIG. 21 an alternate type of mechanical spring construction is shown which can be substituted for that of FIGS. 18–20. In this embodiment the member 46a, which is analogous to member 46 of the previous drawings, is formed integrally with attachment member 54 and it includes annular disc-like flexible spring member 120 and 121 formed integrally therewith which are spaced by annular grooves 122 and 123, respectively, from central portion 124. When annular spring member 121 bottoms out under a high compressive shock force, abutment 125 will engage the top surface of link 35, and when annular spring member 120 bottoms out under a high tensile shock force, surface 126 will engage member 50. It will be appreciated that annular spring members 120 and 121, in combination, will absorb low amplitude forces in both tension and compression. It is to be noted that the outer edges of portions 120, 121 and 124 of member 46a do not engage the inner annular surface of cylinder extension 28, and thus there is no metal-to-metal contact which can transmit forces therethrough.

Figure 22:
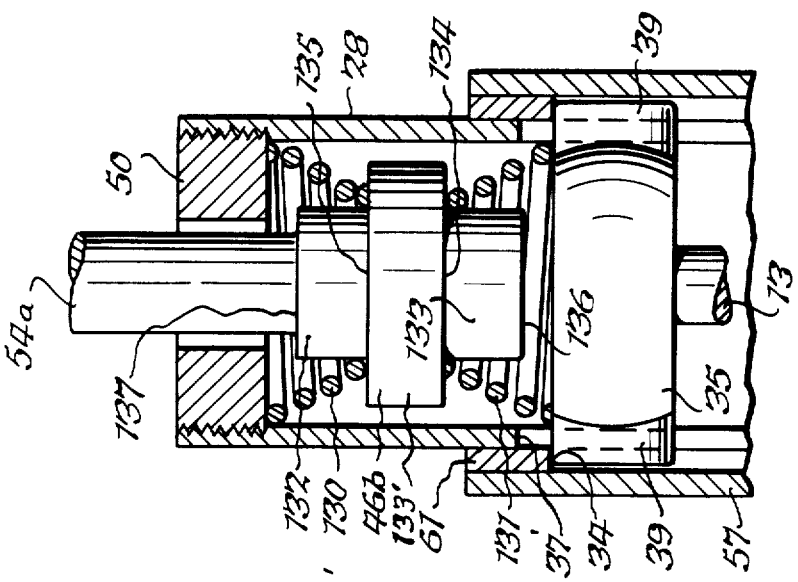
FIG. 22 is a view of another modification which can be used for the spring structure of FIGS. 18-20.

In FIG. 22 another modified embodiment of FIGS. 18–20 is also shown. In this embodiment, frustoconical helical springs 130 and 131 encircle bosses 132 and 133, respectively, on opposite sides of the central portion 133' of member 46b. The inner ends of springs 130 and 131 bear on surfaces 135 and 134 of member 46b. The outer end of spring 130 bears on member 50 and the outer end of spring 1bear on surfaces 135 and 134 of member 46b. The outer end of spring 130 bears on member 50 and the outer end of spring 131 bears on link 35. Springs 130 and 131 absorb low amplitude forces applied to attachment member 54. Furthermore, the unit of FIG. 22 can be initially loaded in either tension or compression, as described above relative to FIGS. 18-20. When a high shock force in compression is applied to member 54, surface 136 of boss 133 will engage link 35, and when a high shock force in tension is applied to member 54, surface 137 of boss 132 will engage the underside of member 50. The action of the embodiment of FIG. 22 is essentially the same as that of FIGS. 18-20. It is to be noted that member 46b is spaced from the inner wall of cylinder extension 28 and therefore vibrational forces will not be transmitted through the latter by any metal-to-metal contact.

Figure 23:
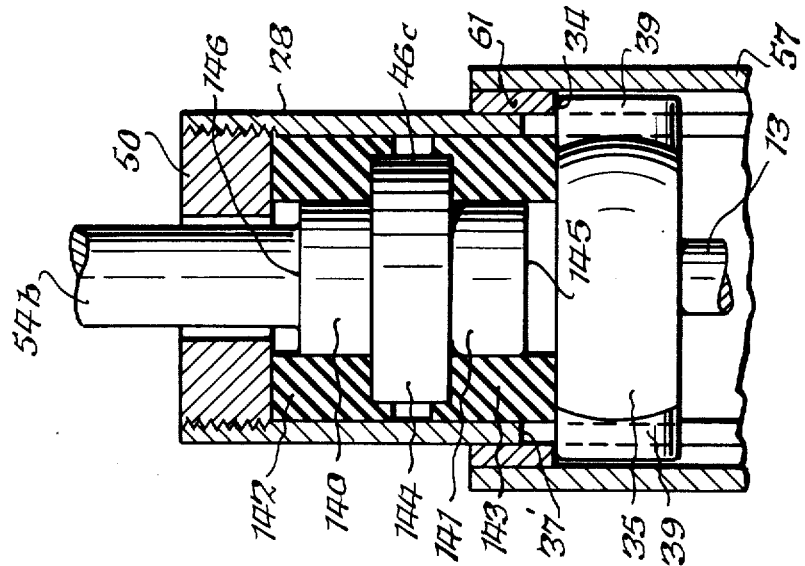
FIG. 23 is a view of a still further modification of the spring structure of FIGS. 18-20.

In FIG. 23 a still further embodiment of FIGS. 18-20 is shown wherein member 46c is formed with bosses 140 and 141 on opposite sides thereof and an upper solid elastomeric spring 142 and a lower solid elastomeric spring 143 encircle bosses 140 and 141, respectively. Furthermore, springs 142 and 143 are formed about central portion 144 of member 46c so as to hold it in spaced relationship to the inner wall of cylinder extension 28, thereby preventing contact therebetween which could result in transmitting of vibrational forces because of a metal-to-metal contact. Aseventing contact therebetween which could result in transmitting of vibrational forces because of a metal-to-metal contact. As explained above relative to FIGS. 18-20, low amplitude forces will be absorbed by springs 142 and 143. When a high shock force in compression is applied to member 54b, surface 145 of boss 141 will engage link 35 to drive piston 13 into its associated cylinder 12. When a high force in tension is applied to member 54b, surface 146 of boss 140 will engage member 50 to pull the cylinder 12 onto piston 13, as explained above.

In the embodiments of FIGS. 21-23, the only differences over the embodiment of FIGS. 18-20 are in the mechanical spring constructions shown in the drawings, the remainder of the ues over the embodiment of FIGS. 18-20.

In the various embodiments of FIGS. 9-20, the mechanical springs have been shown in specific locations. However, it will be appreciated that in certain instances these springs can be relocated while still functioning in their intended manner, and such relocations are within the scope of the present invention. Furthermore, as noted above in the various embodiments of FIGS. 9-23 the damping head is in abutting relationship to seal 16, that is, it is in its dotted line position. Otherwise the liquid spring will tend to compress the mechanical spring beyond its ability to absorb low amplitude forces. The solid line position of the damping head 23 merely designates its location during assembly or where it can be located in the prior device of U.S. Pat. No. 4,611,794 in the event the tension-compression unit is preloaded beyond the amount where the damping head is against seal 16.

While preferred embodiments of the present invention have been disclosed, it will be appreciated that it is not limited thereto, but may be otherwise embodied within the scope of the following claims.

What is claimed is:

1. A liquid spring unit operable in both tension and compression comprising: a liquid spring including a cylinder, piston, compressible liquid in said cylinder, and liquid seal means between said piston and cylinder; a housing mounting said cylinder therein for slidable movement; first attachment means on said housing for attachment to a first structural member; second attachment means spaced from said first attachment means and mounted relative to said cylinder for attachment to a second structural member; first means supported by said housing for holding said cylinder against movement in a first direction when said first and second spaced attachment means are moved toward each other to cause said second attachment means to effectively engage said piston and cause said piston to move in said first direction into said cylinder to thereby provide a spring action in compression; second means supported by said housing for holding said piston against movement in a second direction which is opposite to said first direction when said first and second spaced attachment means are moved away from each other to cause said cylinder to be moved in said second direction to thereby provide a spring action in tension; and mechanical spring means having a lower spring force than said liquid spring operatively interposed between said first and second attachment means for absorbing low amplitude forces without driving said piston into said cylinder when said first and second attachment means move relative to each other in response to said low amplitude forces being applied thereto.

2. A liquid spring unit operable in both tension and compression as set forth in claim 1 including stop means operatively associated with said mechanical spring means for limiting the amount of compression of said mechanical spring means.

3. A liquid spring unit operable in both tension and compression as set forth in claim 1 wherein said mechanical spring means are located between said cylinder and said housing.

4. A liquid spring unit operable in both tension and compression as set forth in claim 3 including stop means operatively associated with said mechanical spring means for limiting the amount of compression of said mechanical spring means.

5. A liquid spring unit operable in both tension and compression as set forth in claim 4 wherein said stop means comprises a boss located between said cylinder and said housing.

6. A liquid spring unit operable in both tension and compression as set forth in claim 1 wherein said mechanical spring means are located between said second attachment means and said piston.

7. A liquid spring unit operable in both tension and compression as set forth in claim 6 including stop means operatively associated with said mechanical spring means for limiting the amount of compression of said mechanical spring means.

8. A liquid spring unit operable in both tension and compression as set forth in claim 7 wherein said stop means comprises a boss located between said second attachment means and said piston.

9. A liquid spring unit operable in both tension and compression as set forth in claim 1 wherein said cylinder includes a cylinder extension, and wherein said mechanical spring means are located between said second attachment means and said cylinder extension.

10. A liquid spring unit operable in both tension and compression as set forth in claim 9 including stop means operatively associated with said mechanical spring means for limiting the amount of compression of said mechanical spring means.

11. A liquid spring unit operable in both tension and compression as set forth in claim 10 wherein said stop means comprises a boss located between said second attachment means and said cylinder extension.

12. A liquid spring unit operable in both tension and compression as set forth in claim 1 wherein said cylinder includes a cylinder extension and wherein said mechanical spring means comprises first mechanical spring means interposed between said piston and said second attachment means, and second mechanical spring means interposed between said cylinder extension and said second attachment means.

13. A liquid spring unit operable in both tension and compression as set forth in claim 12 including first and second stop means for limiting the amount of compression of said first and second mechanical spring means, respectively.

14. A liquid spring unit operable in both tension and compression as set forth in claim 13 wherein said first stop means are interposed between said piston and said second attachment means, and wherein said second stop means are interposed between said cylinder extension and said second attachment means.

15. A liquid spring unit operable in both tension and compression comprising: a liquid spring including a cylinder, a piston, compressible liquid in said cylinder, and liquid seal means between said piston and cylinder; a housing mounted about said cylinder and slidably mounting said cylinder therein for movement relative thereto; link means for movably coupling said piston to said housing and for permitting it to move in a first direction toward said cylinder but holding it against movement in a second direction opposite to said first direction away from said cylinder; first attachment means supported by said housing for attachment to a first external member; and second attachment means effectively mounted relative to said cylinder for attachment to a second external member for moving said cylinder in said second direction away from said first attachment means while said piston is held against movement by said link means to thereby provide a liquid spring action for tension forces; said second attachment means moving said piston in said first direction when said second attachment means moves toward said first attachment means while said housing holds said cylinder against movement in said first direction to thereby provide a liquid spring action for compression forces; and mechanical spring means having a lower spring force than said liquid spring operatively interposed between said first and second attachment means for absorbing low amplitude forces without driving said piston into said cylinder when said first and second attachment means move relative to each other in response to said low amplitude forces being applied thereto.

16. A liquid spring unit operable in both tension and compression as set forth in claim 15 wherein said cylinder includes a cylinder extension and wherein said mechanical spring means comprises first mechanical spring means interposed between said piston and said second attachment means, and second mechanical spring means interposed between said cylinder extension and said second attachment means.

17. A liquid spring unit operable in both tension and compression as set forth in claim 16 including first and second stop means for limiting the amount of compression of said first and second mechanical spring means, respectively.

18. A liquid spring unit operable in both tension and compression as set forth in claim 17 wherein said first stop means are interposed between said piston and said second attachment means, and wherein said second stop means are interposed between said cylinder extension and said second attachment means.

19. A liquid spring unit operable in both tension and compression comprising a liquid spring having a cylinder, a piston having a first portion within said cylinder and a second portion external of said cylinder, a seal between said cylinder and piston, compressible liquid in said cylinder, a cylinder extension attached to said cylinder and having a plurality of first slots therein, a housing in the form of a sleeve for slidably mounting said cylinder and said cyylinder extension and having a plurality of second slots therein in alignment with said plurality of first slots, a link in engagement with said second portion of said piston and having a plurality of pintles received in said plurality of aligned first and second slots, a first load-receiving member attached to said sleeve, first abutment means on said housing for engaging said cylinder, a second load-receiving member for bearing on said link to force the piston into said cylinder while said pintles travel in said first and second slots toward said cylinder when said load-receiving members are moved toward each other and while said abutment means prevents said cylinder from moving relative to said housing, second abutment means on said cylinder extension for selectively being engaged by said second load-receiving member, said second slots having ends remote from said cylinder for engaging said pintles and preventing movement of said link when said second load-receiving member engages said second abutment means and said first and second load-receiving members are pulled away from each other, and mechanical spring means having a lower spring force than said liquid spring operatively interposed between said first and second attachment means for absorbing low amplitude forces without driving said piston into said cylinder when said first and second attachment means move relative to each other in response to said low amplitude forces being applied thereto.

20. A liquid spring unit operable in both tension and compression as set forth in claim 19 wherein said mechanical spring means comprises first mechanical spring means interposed between said piston and said second attachment means, and second mechanical spring means interposed between said cylinder extension and said second attachment means.

21. A liquid spring unit operable in both tension and compression as set forth in claim 20 including first and second stop means for limiting the amount of compression of said first and second mechanical spring means, respectively.

22. A liquid spring unit operable in both tension and compression as set forth in claim 21 wherein said first stop means are interposed between said piston and said second attachment means, and wherein said second stop means are interposed between said cylinder extension and said second attachment means.

* * * * *

UNITED STATES PATENT AND TRADEMARK OFFICE
CERTIFICATE OF CORRECTION

PATENT NO. : 4,718,648

DATED : January 12, 1988

INVENTOR(S) : Douglas Taylor

It is certified that error appears in the above-identified patent and that said Letters Patent is hereby corrected as shown below:

Column 3, lines 45-46, change "pistion" to --position--.

Column 7, lines 31-33, cancel "tthe unit 85 is shown after having been subjected to a high tensile shock force and the parts are shown in the position which".

Column 8, line 48, change "member" to --members--.

Column 9, lines 2-4, cancel "lbear on surfaces 135 and 134 of member 46b. The outer end of spring 130 bears on member 50 and the outer end of spring".

Column 9, lines 29-31, cancel "Aseventing contact therebetween which could result in transmitting of vibrational forces because of a metal-to-metal contact."

Column 9, line 43, change "ues over the embodiment of" to --units being identical to those shown in--.

Column 12, line 20 (claim 19), change "cyylinder" to --cylinder--.

Signed and Sealed this

Seventh Day of June, 1988

Attest:

DONALD J. QUIGG

Attesting Officer

Commissioner of Patents and Trademarks